Figure 1:
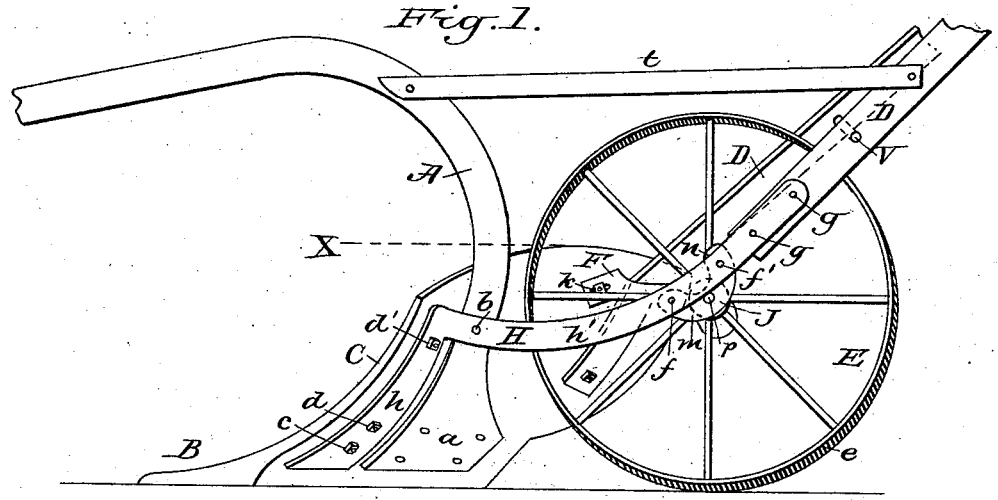

(No Model.)

J. LANE.
WHEEL LANDSIDE PLOW.

No. 301,822. Patented July 8, 1884.

Witnesses:
E. L. Lane
L. Lienhard

Inventor
John Lane.

UNITED STATES PATENT OFFICE.

JOHN LANE, OF HYDE PARK, ASSIGNOR TO THE HAPGOOD PLOW COMPANY, OF ALTON, ILLINOIS.

WHEEL LANDSIDE-PLOW.

SPECIFICATION forming part of Letters Patent No. 301,822, dated July 8, 1884.

Application filed March 31, 1884. (No model.)

*To all whom it may concern:*

Be it known that I, JOHN LANE, a citizen of the United States, residing at Hyde Park, in the county of Cook and State of Illinois, have invented a new and useful Improvement in Wheel Landside-Plows, of which the following is a specification.

This improvement relates to "wheel landside-plows," having an object to improve the general construction, whereby a light plow of greater strength is produced; and the invention consists in certain improvements which will first be described in the specification, with reference to the drawings, and afterwards pointed out in the claims.

In the drawings, like letters refer to like parts in all the figures, in which—

Figures 2, 6:
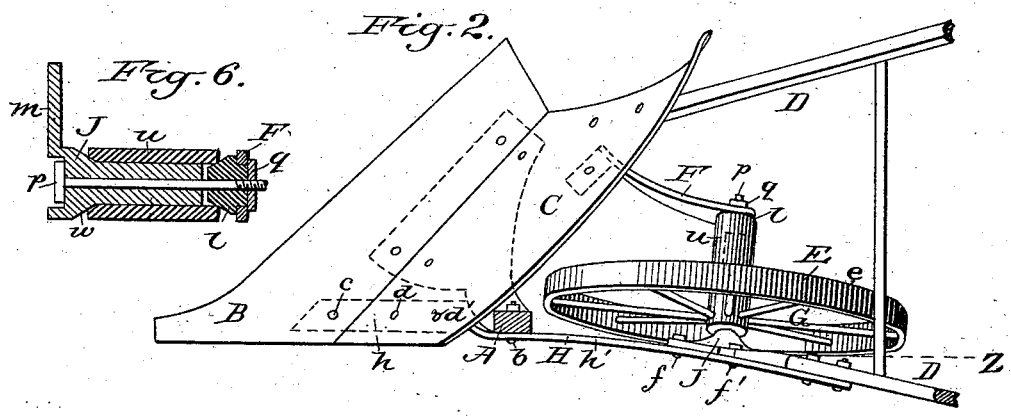
Figures 3, 4:
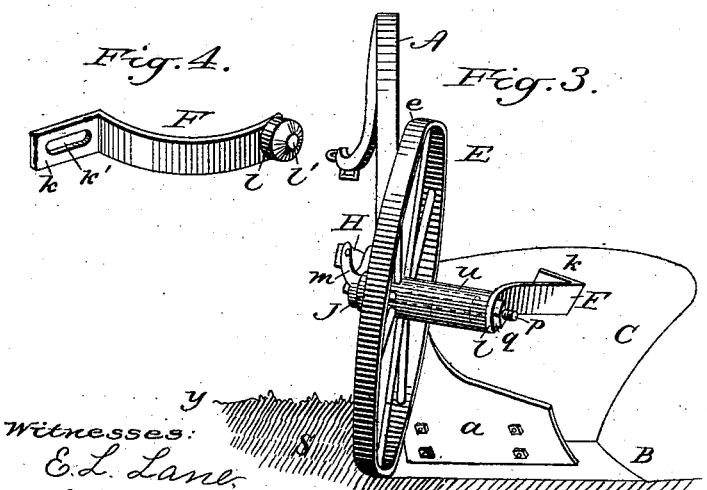
Figure 5:

Figure 1 is a side elevation of a wheel landside-plow, with the ends of the beam and handles broken away, showing my improvements, the bar or arm H being specially conspicuous. Fig. 2 is a top or plan view of same, with the beam removed above the dotted line $x$, showing how the wheel is inclined inwardly at its top and front sides, also showing how the wheel may be provided with a face-disk, G. Fig. 3 is a rear elevation view of same, with the handles removed, as when for use on a sulky-plow, showing the position of the wheel relative to the furrow, the rear lower quarter of the wheel against the perpendicular side of the furrow. Fig. 4 is a perspective view, enlarged, of the brace F. Fig. 5 is a perspective view, enlarged, of the axle J. Fig. 6 is a cross-section view, enlarged, taken through the center of the axle J, with the hub $u$, cone-bearing $l$, and brace F, all the parts in position relative to each other.

A represents a bent iron or steel plow-beam; B, the share; C, the mold-board; E, the wheel, and D D the handles, all of which may be of ordinary construction, as shown, except as modified to adapt them for use with my improvements, as hereinafter shown.

The rear or foot end $a$, of the beam A, may be flattened, twisted, and bent curved under, supporting the mold-board and share, as a frame, to which the said share and mold-board may be attached with bolts, as shown.

H represents my improved attachment-arm, constructed of a bar bent in two parts, the front bar, $h$, bent curved under the front ends of the mold-board and share, supporting the front end of the share, and attached with the bolt $c$ to the share, and the bolts $d$ and $d'$ to the mold-board, as shown. Near the top of the mold-board the said bar is twisted and bent rearward, forming the rear part, $h'$, attached to and supporting the beam with the bolt $b$, and its rear end curved upward and attached to and supporting the handle D, with the bolts $g$ and $g'$, as shown. The said rear part, $h'$, is also attached to and supports the axle J, with bolts $f$ and $f'$, as shown in the drawings.

J represents the axle provided with the spindle $i$, upon which the wheel rotates, and a bracket, $m$, for attachment to the arm H. One end of the said bracket $m$ is provided with a round-hole perforation, and attached with the bolt $f$ to the said arm H, the other end provided with a long slot-hole perforation, and attached with the bolt $f'$, whereby the said axle may be adjusted by the bolt in the said slot. The said spindle $i$ is provided with a shoulder, $w$, which may be inclined cone-shaped to bear against the end of the hub, and the said spindle $i$ is preferably provided with a perforation throughout its length for the bolt $p$, used in connecting the brace F. The head of the said bolt $p$ may be seated in a recess in the outer end of the said axle to avoid the gathering of trash, and with the nut $q$ on its inner end, as shown in Fig. 6.

F represents the brace, its outer end attached to the mold-board and its inner end supporting the inner end of the hub $u$. The said brace F is provided with a lug, $k$, on its outer end, which may be slotted with a long slot perforation, $k'$, whereby the said brace may be adjusted to the wheel by the bolt in the said slot and mold-board, as will be understood by the drawings. The inner end of the said brace may be provided with the cone-bearing $l$, with the perforation $l'$, and the said cone-bearing $l$ may be made solid with the said brace, as shown in Fig. 4, or made separate and seated in the said brace, as shown in Fig. 6. Any slack by wear of the hub, axle, or cone-bearing may be taken up by screwing up the nut $q$ on the bolt $p$, driving the said cone-bearing to a close seat against the hub, whereby all wabbling of the wheel may be prevented. It will be observed that the spindle $i$ is shorter than the length of the said hub $u$, and a space is left between the end of the spindle and the cone-bearing $l$, which is provided for the take-up of wear, as will be understood by the drawings.

The wheel E may be provided with a light flat bar-rim, $e$, round bar-spokes $r$, and light cast-iron hub $u$, the latter projecting both outside and inside of the said rim, as an ordinary wheel. I preferably make the said hub of greater length than common, and the extra length on the inner end or inner side of the rim to provide a long bearing on the axle, by which the wheel will be more durable in its bearing-wear and less liable to clog and gather trash, as will be understood by the drawings. The said wheel E, seated rotary on the axle J, is adjusted and set with its top side and front side inclined toward the mold-board side of the plow, which incline may be more or less, as desired, as shown in the drawings. The wheel thus inclined the tread of the rim will be on the furrow-bottom, with the lower rear quarter outside of the rim abutting against the perpendicular side of the furrow, as will be understood by Fig. 3, and by which the front side of the wheel is free to rotate to the bottom of the furrow without striking the edge of the furrow.

In Fig. 2, G represents a dishing or convexed thin ring, disk, or flange, with an open center, with which the said wheel E may be provided, attached or made solid to the outer side of the rim $e$. The said flange may be of a width equal to the depth of plowing, and the dishing equal to the inclination of the wheel, by which the lower rear quarter may face and bear against to the perpendicular side of the furrow, as will be understood by the drawings. The said disk G is preferably made with the open center, as shown in the drawings, by which trash will fall through the center opening away from the wheel, and be less liable to clog than the solid disk heretofore used. By reason that the said wheel E is made large, and its front side inclined inward, the incline of the top side may be slight from the perpendicular sufficient only to bring the lower rear quarter to bear against the perpendicular side of the furrow, and the said rear quarter, being far in rear of the plowshare and mold-board, will act as a long lever, more steadily holding the plow to its work than heretofore.

My entire plow is light and simple in construction, the attachment arm a stiff substantial support to the several parts thereto attached, the axle inexpensive and removable, by which a new one may replace a worn one at light expense, the whole forming a durable, effective, and strong combination of parts.

Having thus described and set forth my invention, what I claim, and desire to secure by Letters Patent, is—

1. In a wheel landside-plow, the attachment arm constructed in two parts, the front part curved under and supporting the mold-board and share and attached thereto, the rear part extending rearward and curved upward, and the beam, the axle, and handle, attached to the said rear part with bolts, substantially as and for the purpose set forth.

2. In a wheel landside-plow, the attachment arm constructed in two parts, the front part curved under and supporting the mold-board and share and attached thereto, the rear part extending rearward, and the beam and axle attached thereto, in combination with the brace, attached to the mold-board, and with the wheel, all substantially as and for the purpose set forth.

3. In a wheel landside-plow, the axle provided with the bracket and hollow spindle, in combination with the attachment arm, wheel, and brace, the said bracket attached to the said attachment arm with bolts, and a bolt extending through the said hollow spindle, connecting with the said brace, all substantially as and for the purpose set forth.

4. In a wheel landside-plow, the brace provided with the lug and perforated cone-bearing, the said lug attached to the mold-board, and the said cone-bearing seated in the hub of the wheel, in combination with the wheel, hollow spindle, and bolt $p$, all substantially as and for the purpose set forth.

5. In a wheel landside-plow, the combination of the beam A, share B, mold-board C, attachment arm H, constructed in two parts, as shown, the axle J, provided with the bracket, attached to the said attachment arm, the wheel E, and the brace F, and handles D D, all substantially as and for the purpose set forth.

Hyde Park, Illinois, March 15, 1884.

JOHN LANE.

Witnesses:
GEO. C. WILSON,
JOSEPH N. BARKER.